US012672172B2

(12) United States Patent
Chen et al.

(10) Patent No.: US 12,672,172 B2
(45) Date of Patent: Jun. 30, 2026

(54) LONG-TERM MEASUREMENT FOR RECEIVER-ASSISTED CHANNEL ACCESS

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/263,688

(22) PCT Filed: Apr. 9, 2021

(86) PCT No.: PCT/CN2021/086091
§ 371 (c)(1),
(2) Date: Jul. 31, 2023

(87) PCT Pub. No.: WO2022/213344
PCT Pub. Date: Oct. 13, 2022

(65) Prior Publication Data
US 2025/0220717 A1      Jul. 3, 2025

(51) Int. Cl.
| *H04W 74/0833* | (2024.01) |
| *H04B 7/06* | (2006.01) |
| *H04B 7/08* | (2006.01) |

(52) U.S. Cl.
CPC .... *H04W 74/0833* (2013.01); *H04B 7/06952* (2023.05); *H04B 7/088* (2013.01)

(58) Field of Classification Search
CPC .......................... H04W 74/0833; H04B 7/088; H04B 7/06952
See application file for complete search history.

(56) References Cited

U.S. PATENT DOCUMENTS

| 2022/0124806 A1* | 4/2022 | Hu | H04W 16/28 |
| 2022/0369369 A1* | 11/2022 | Cui | H04W 48/16 |
| 2023/0189020 A1* | 6/2023 | Calcev | H04W 72/21 |
| | | | 370/329 |

FOREIGN PATENT DOCUMENTS

| CN | 112583462 A | 3/2021 |
| WO | WO-2020140935 A1 | 7/2020 |

OTHER PUBLICATIONS

International Search Report and Written Opinion—PCT/CN2021/086091—ISA/EPO—Jan. 6, 2022.
(Continued)

Primary Examiner — Derrick V Rose
(74) Attorney, Agent, or Firm — Harrity & Harrity, LLP

(57) ABSTRACT
Various aspects of the present disclosure generally relate to wireless communication. In some aspects, a user equipment (UE) may receive a trigger for obtaining long-term measurements associated with receiver-assisted channel access. The UE may obtain a long-term measurement for a channel after receiving the trigger. The UE may transmit an indication of the long-term measurement or a preferred beam that is selected based at least in part on the long-term measurement. Numerous other aspects are described.

21 Claims, 12 Drawing Sheets

500 —►

(56)             References Cited

OTHER PUBLICATIONS

Lenovo, et al., "Channel Access Mechanisms for NR from 52.6 GHz to 71GHz", 3GPP TSG RAN WG1 #104-bis-e, R1-2103001, e-meeting, Apr. 12-20, 2021, Apr. 6, 2021, Section 7, 17 Pages.
NTT DOCOMO, Inc: "Channel Access Mechanism for NR from 52.6to 71 GHz", 3GPP TSG RAN WG1 Meeting #104bis-e, R1-2103572, Electronic Meeting, Apr. 12-20, 2021, Apr. 7, 2021 (Apr. 7, 2021) Section 2.4, pp. 1-9.

* cited by examiner

1010   Configure a UE for obtaining long-term measurements associated with received-assisted channel access 1020   Transmit a trigger for obtaining long-term measurements 1030   Receive an indication of a long-term measurement or a preferred beam that is selected based at least in part on the long-term measurement

1000

LONG-TERM MEASUREMENT FOR RECEIVER-ASSISTED CHANNEL ACCESS

CROSS-REFERENCE TO RELATED APPLICATION

This application is a 371 national stage of Patent Cooperation Treaty (PCT) Application No. PCT/CN2021/086091 filed on Apr. 9, 2021, entitled "LONG-TERM MEASUREMENT FOR RECEIVER-ASSISTED CHANNEL ACCESS," which is hereby expressly incorporated by reference herein.

FIELD OF THE DISCLOSURE

Aspects of the present disclosure generally relate to wireless communication and to techniques and apparatuses for long-term measurements for receiver-assisted channel access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a trigger for obtaining long-term measurements associated with receiver-assisted channel access, obtaining a long-term measurement for a channel after receiving the trigger, and transmitting an indication of the long-term measurement or a preferred beam that is selected based at least in part on the long-term measurement.

In some aspects, a method of wireless communication performed by a base station includes configuring a UE for obtaining long-term measurements associated with received-assisted channel access, transmitting a trigger for obtaining long-term measurements, and receiving an indication of a long-term measurement or a preferred beam that is selected based at least in part on the long-term measurement.

In some aspects, a UE for wireless communication includes a memory and one or more processors, coupled to the memory, configured to receive a trigger for obtaining long-term measurements associated with receiver-assisted channel access, obtain a long-term measurement for a channel after receiving the trigger, and transmit an indication of the long-term measurement or a preferred beam that is selected based at least in part on the long-term measurement.

In some aspects, a base station for wireless communication includes a memory and one or more processors, coupled to the memory, configured to configure a UE for obtaining long-term measurements associated with received-assisted channel access, transmit a trigger for obtaining long-term measurements, and receive an indication of a long-term measurement or a preferred beam that is selected based at least in part on the long-term measurement.

In some aspects, a non-transitory computer-readable medium storing a set of instructions for wireless communication includes one or more instructions that, when executed by one or more processors of a UE, cause the UE to receive a trigger for obtaining long-term measurements associated with receiver-assisted channel access, obtain a long-term measurement for a channel after receiving the trigger, and transmit an indication of the long-term measurement or a preferred beam that is selected based at least in part on the long-term measurement.

In some aspects, a non-transitory computer-readable medium storing a set of instructions for wireless communication includes one or more instructions that, when executed by one or more processors of a base station, cause the base station to configure a UE for obtaining long-term measurements associated with received-assisted channel access, transmit a trigger for obtaining long-term measurements, and receive an indication of a long-term measurement or a preferred beam that is selected based at least in part on the long-term measurement.

In some aspects, an apparatus for wireless communication includes means for receiving a trigger for obtaining long-term measurements associated with receiver-assisted channel access, means for obtaining a long-term measurement for a channel after receiving the trigger, and means for transmitting an indication of the long-term measurement or a preferred beam that is selected based at least in part on the long-term measurement.

In some aspects, an apparatus for wireless communication includes means for configuring a UE for obtaining long-term measurements associated with received-assisted channel access, means for transmitting a trigger for obtaining long-term measurements, and means for receiving an indication of a long-term measurement or a preferred beam that is selected based at least in part on the long-term measurement.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
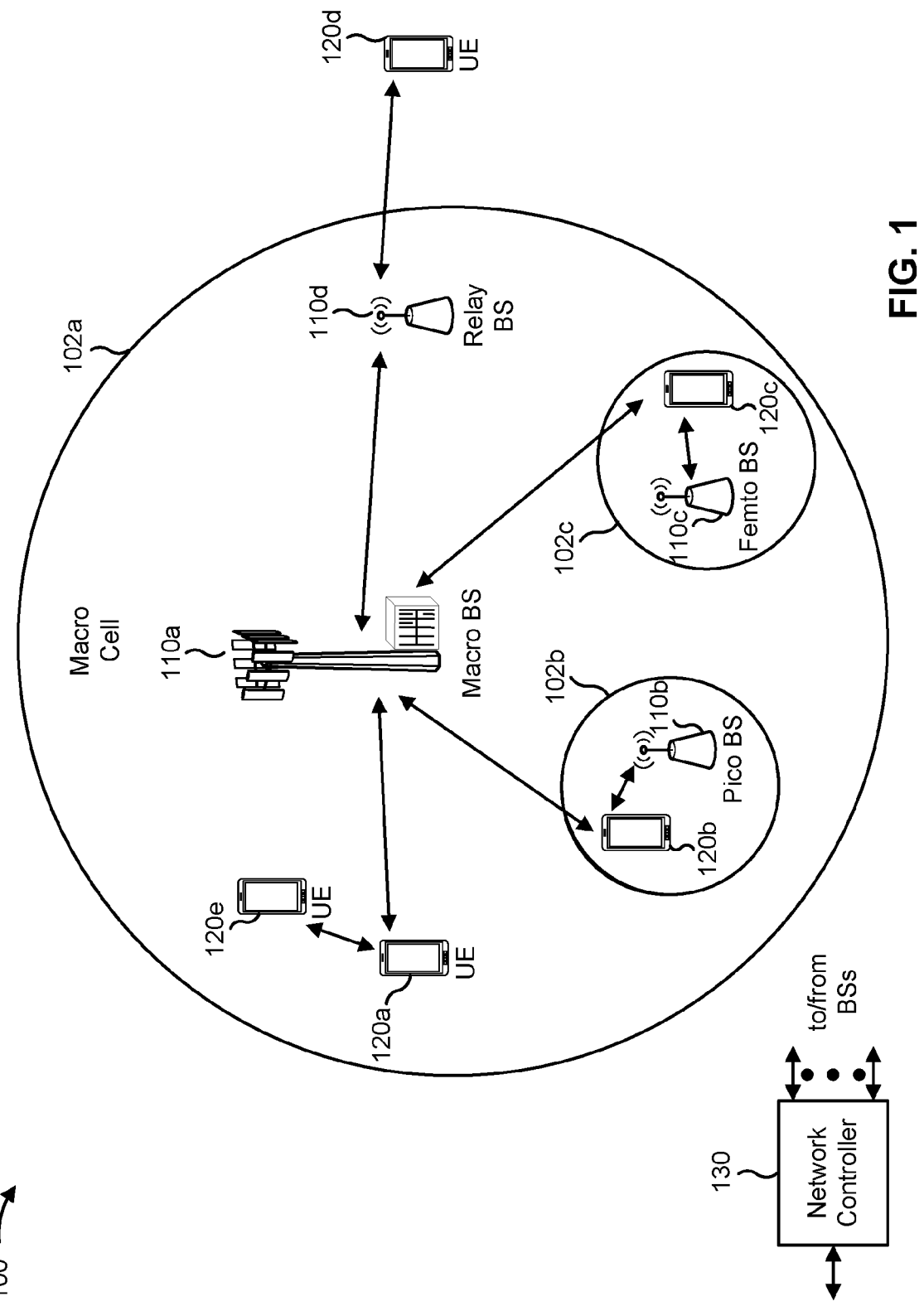
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
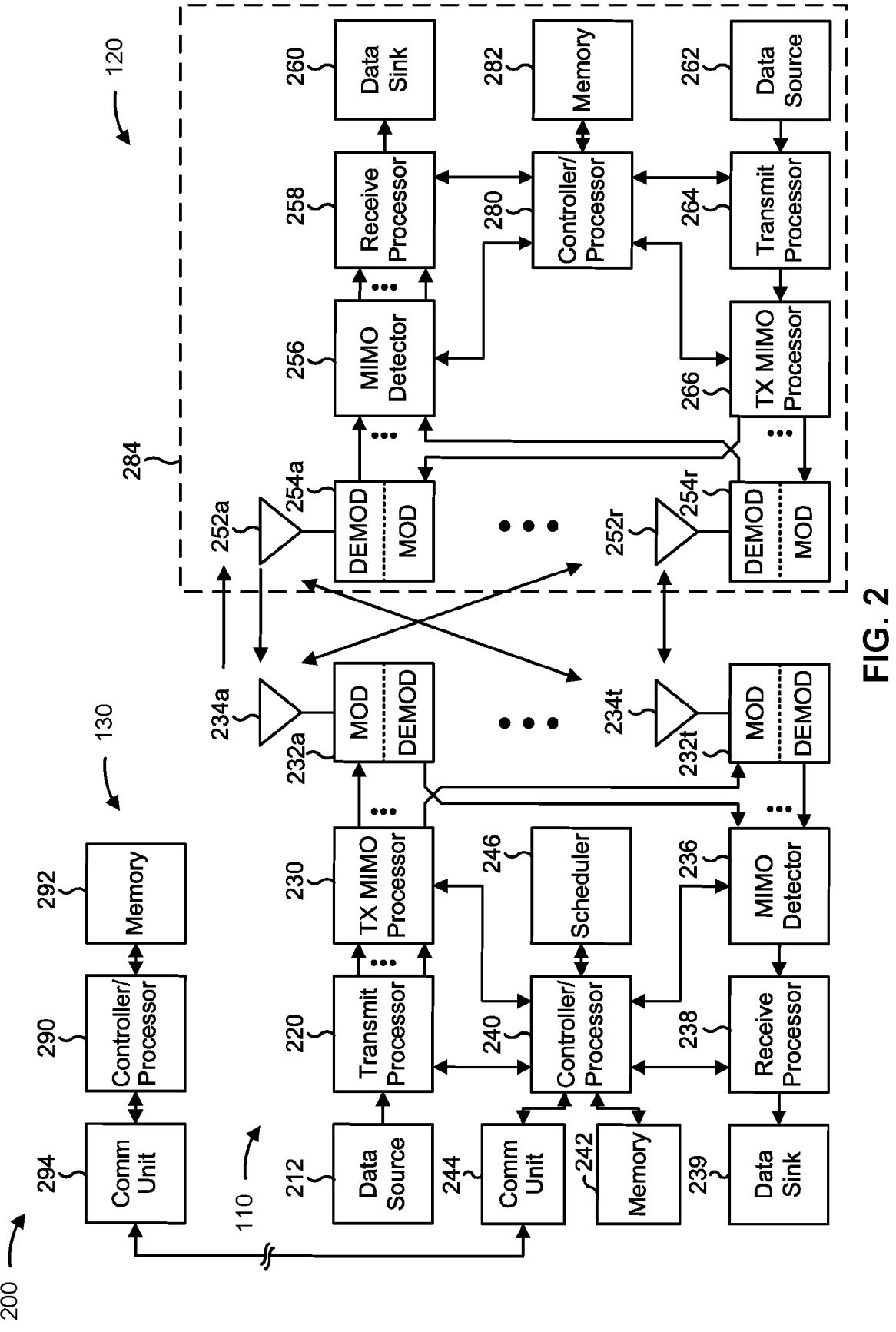
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-12.

Controller/processor 240 of base station 110, controller/processor 280 of UE 120, and/or any other component(s) of FIG. 2 may perform one or more techniques associated with long-term measurements for receiver-assisted channel access, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for receiving a trigger for obtaining long-term measurements associated with receiver-assisted channel access, means for obtaining a long-term measurement for a channel after receiving the trigger, and/or means for transmitting the long-term measurement or a preferred beam that is selected based at least in part on the UE long-term measurement. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for configuring a UE for obtaining long-term measurements associated with received-assisted channel access, means for transmitting a trigger for obtaining long-term measurements, and/or means for receiving a long-term measurement or a preferred beam that is selected based at least in part on the long-term measurement. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
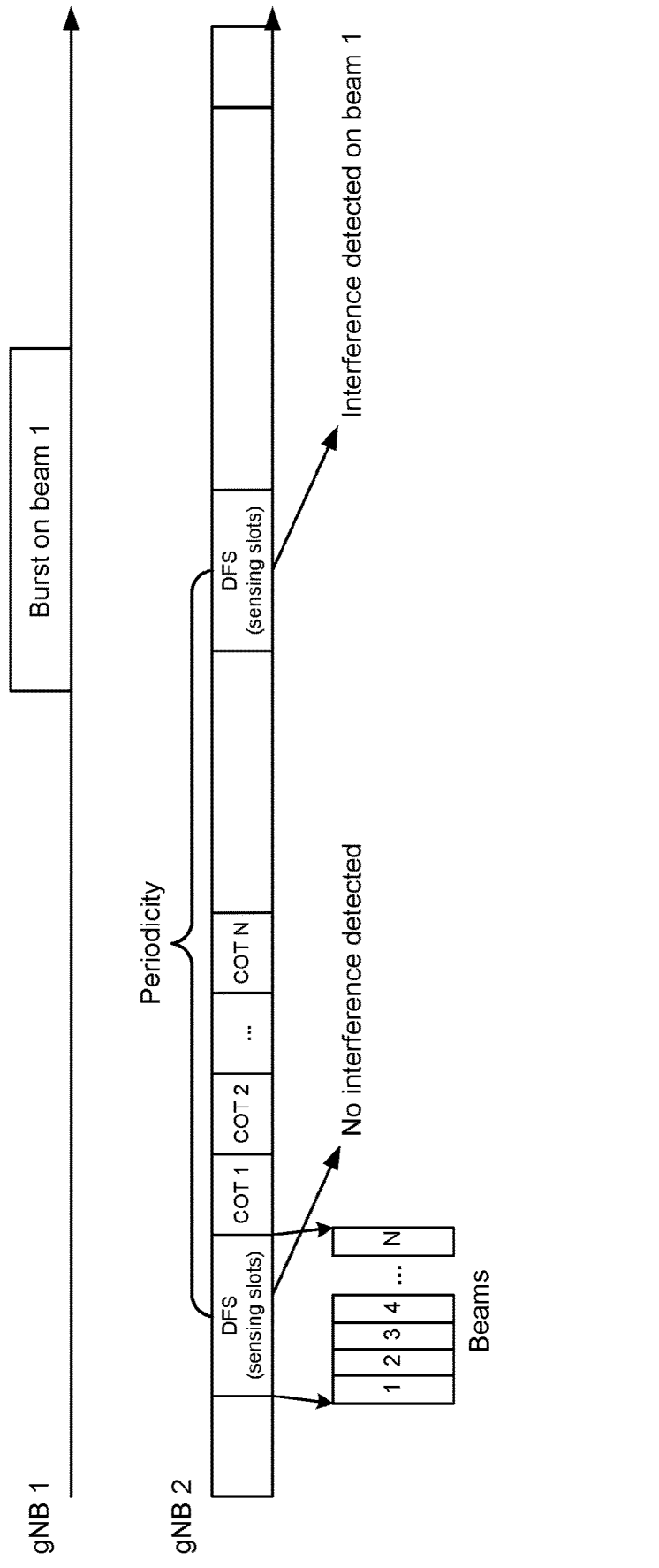
FIG. 3 is a diagram illustrating an example of sensing a channel, in accordance with the present disclosure.

FIG. 3 is a diagram illustrating an example 300 of sensing a channel, in accordance with the present disclosure.

Long-term sensing may involve periodic measurements of a channel. Example 300 shows a first base station (gNB 1) that may transmit a burst (Burst 1) that may be detected by a second base station (gNB 2). At a regular periodicity, gNB 2 may sense the channel for multiple beams during a sensing slot. The sensing may be for dynamic frequency selection (DFS). At a first sensing occasion, gNB 2 does not sense any energy on the channel, and there is no additional restriction on the channel. At a second sensing occasion, gNB 2 detects the burst from gNB 1, and there may be a restriction on using the beam for which the burst was detected.

Directional transmission and reception beamforming in mmWave may involve some inability to sense a channel. This is more of an issue when channel sensing is performed only at the transmitter side. Another issue may involve a node that is hidden to a transmitter due to an inability to detect interference as the receiver. Yet another issue may involve an exposed node, where the transmitted is detecting interference that is tolerable or harmless at the receiver. Receiver-assisted channel sensing is more beneficial than transmitter-only channel sensing. Receiver-assisted channel sensing may involve difference scenarios or classes. Class A refers to receiver-assisted channel access includes sensing at the receiver, where the receiver transmits the assistance information to the serving transmitter. Class B refers to sensing where the assistance information is transmitted to other transmitters and not only the serving transmitter. Class C refers to sensing where the assistance information is transmitted to other transmitters, including transmitted of another RAT. The aspects described herein pertain to Class A receiver-assisted channel sensing.

As indicated above, FIG. 3 is provided as an example. Other examples may differ from what is described with regard to FIG. 3.

Figure 4:
FIG. 4 is a diagram illustrating an example of receiver-assisted channel access, in accordance with the present disclosure.

FIG. 4 is a diagram illustrating an example 400 of receiver-assisted channel access, in accordance with the present disclosure. Example 400 shows a base station (BS) 410 (e.g., base station 110) that is seeking to establish a contending link with UE 420 (e.g., UE 120). BS 430 (e.g., base station 110) is transmitting communications on an ongoing link to UE 440 (e.g., UE 120), which is nearby to UE 420.

Channel sensing may involve a listen-before-talk (LBT) procedure that involves sensing a channel for a new contending link and preventing a new communication on the contending link if the new communication would collide with an ongoing link. For example, BS 410 may perform an LBT procedure for the contending link to UE 420. BS 410 does not detect any interference from BS 430. However, UE 420 does happen to experience interference from BS 430 caused by the ongoing link. There could be a channel collision of which BS 410 is not aware. Also, in licensed band mmWave, layer 1 (L1) RSRP or L1 signal-to-noise-plus-interference (SINR) measurements may be used for beam selection, because interference in a licensed band is more stable than in an unlicensed band. Therefore, if UE 420 uses L1-RSRP or L1-SINR measurements in an unlicensed band, UE 420 may miss detection of some signals from other base stations, such as from BS 430. Again, this may cause channel collisions. Channel collisions may cause UE 420 and BS 410 to consume additional processing resources and signaling resources for retransmissions due to the channel collisions.

As indicated above, FIG. 4 is provided as an example. Other examples may differ from what is described with regard to FIG. 4.

Figure 5:
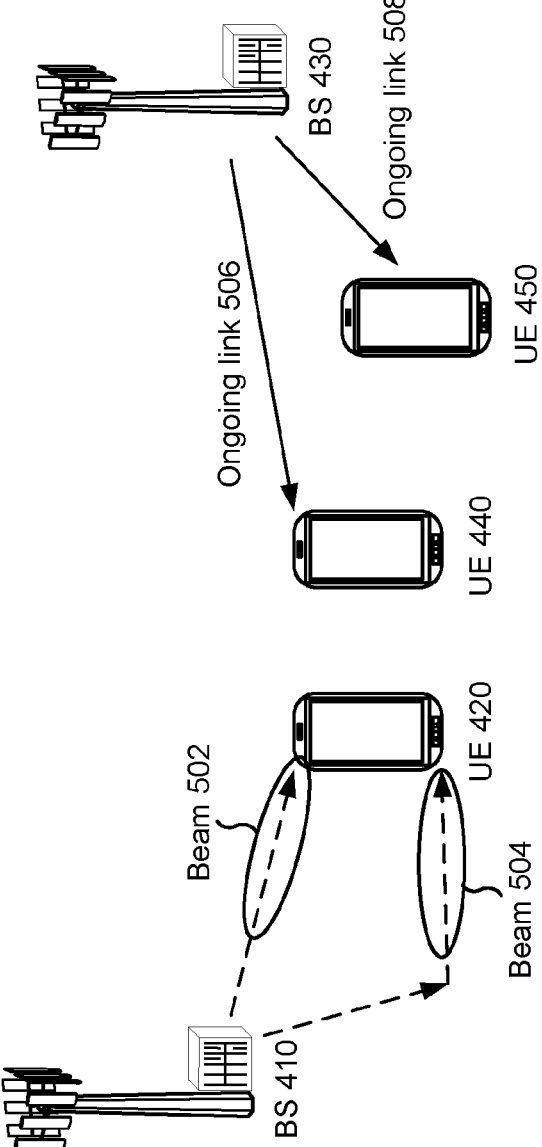
FIG. 5 is a diagram illustrating an example of long-term sensing for receiver-assisted channel access, in accordance with the present disclosure.

FIG. 5 is a diagram illustrating an example 500 of long-term sensing for receiver-assisted channel access, in accordance with the present disclosure. Example 500 shows BS 410 transmitting a link directly received by UE 420 with beam 502 and a reflected link received by UE 420 with beam 504. BS 430 may transmit an ongoing link 506 to UE 440 and another ongoing link 508 to UE 450 (e.g., UE 120).

UE 420 may use Class A receiver-assisted channel access to help BS 410 to obtain interference information not captured by BS 410. Class A receiver-assisted channel access may involve BS 410 transmitting a trigger signal to UE 420, to sense the channel and provide feedback (assistance information) to BS 410. UE 420 may provide the feedback, which may indicate the ongoing link 506 and thus BS 410 may not use the contending link.

According to various aspects described herein, UE 420 may use Class A receiver-assisted channel access with long-term sensing. Class A receiver-assisted channel access is not currently configured for long-term sensing. Without long-term sensing, UE 420 may transmit assistance information that missed detection of other signals that could cause collisions on the channel. UE 420 may sense links on the channel using long-term sensing and transmit assistance information for receiver-assisted channel access. For example, UE 420 may obtain long-term measurements by performing long-term sensing after receiving a trigger for obtaining long term-measurements associated with receiver-assisted channel access, such as Class A receiver-assisted channel access. In some aspects UE 420 may obtain multiple measurements during a long-term sensing duration.

The long-term measurements may include an RSSI and/or a flexible physical layer (L1) signal-to-noise-plus-interference (SINR) measurement (that includes an interference measurement), associated with (and in addition to) a physical layer (L1) signal measurement, for each of one or more configured beams. With flexible L1-SINR, UE 420 may select other interference measurement resources (IMRs) for long-term measurements other than configured IMRs. The long-term measurements may reflect any interference or signal strengths from ongoing link 506 or ongoing link 508.

UE 420 may determine an average among multiple interference measurements and/or an average among multiple long-term measurements. For example, BS 410 may configure UE 420 to measure interference on beam 502. BS 410 may configure a CSI-RS resource that includes a non-zero power (NZP) CSI-RS for signal measurement and a CSI interference measurement (IM) for interference measurement. UE 420 may measure a signal on a given resource by using NZP CSI-RS, but UE 420 may measure the interference not only using the CSI-IM, but also using data on another resource (e.g., beam used to receive the data follows the CSI-RS configuration). UE 420 may average multiple samples for an interference measurement. At the time of measuring L1-SINR, the interference could be low, but this flexible L1-SINR IMR option enables UE 420 to monitor a beam on resources selected by UE 420 for interference purposes. UE 420 may transmit the long-term measurements to BS 410 as the assistance information.

In some aspects, UE 420 may select one or more preferred beams for a link and transmit an indication of the preferred beams as the assistance information. For example, UE 420 may measure an RSRP, an RSRQ, and/or an SINR for each of beam 502 and beam 504 and select beam 504 as a preferred beam. While beam 502 has a greater RSRP, the long-term sensing may detect that UE 420 suffers interference from ongoing link 506. While beam 504 has a smaller RSRP, the long-term sensing detects that beam 504 does not suffer from interference from ongoing link 506 or ongoing link 508. UE 420 may transmit an indication of beam 504 as being a preferred beam. As a result, UE 420 may avoid a collision on the channel and conserve processing resources and signaling resources that would otherwise be consumed by retransmissions to account for the collision.

In some aspects, UE 420 may select the preferred beam such that is accounts for interference cancellation. This may involve obtaining interference measurements and any information about cancellation of interference by other beams and/or interference cancellation measures taken by UE 420. The preferred beam may be selected based at least in part on a capability of UE 420 to perform interference cancellation.

As indicated above, FIG. 5 is provided as an example. Other examples may differ from what is described with regard to FIG. 5.

Figure 6:
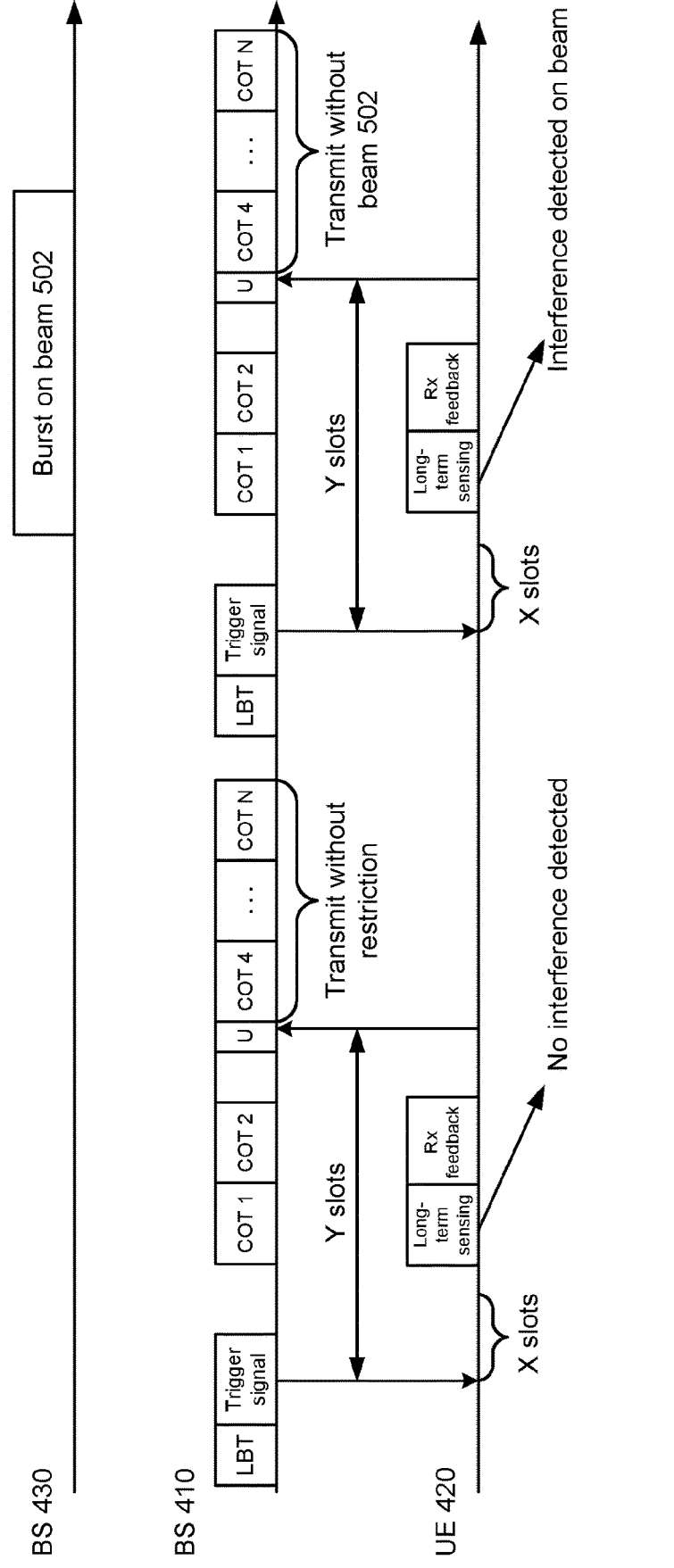
FIG. 6 is a diagram illustrating an example of a timeline for long-term sensing for receiver-assisted channel access, in accordance with the present disclosure.

FIG. 6 is a diagram illustrating an example 600 of a timeline for long-term sensing for receiver-assisted channel access, in accordance with the present disclosure. Example 600 shows a timeline for transmissions from BS 410 and BS 430, and for operations by UE 420.

UE 420 may receive a trigger signal to perform long-term sensing for receiver-assisted channel access. This may involve performing a long-term sensing that is longer in duration than a regular L1-SINR measurement, such as a duration of a channel state information reference signal (CSI-RS) or a duration of a synchronization signal block (SSB). Note that long-term measurements may be obtained from measuring the CSI-RS or the SSB, but the long-term sensing is longer in duration. The long-term sensing may also be as long or longer in duration than a channel occupancy time (COT). As shown by example 600, the trigger signal may indicate a time before performing the sensing (e.g., X slots) and a time for reporting (e.g., Y slots). If UE 420 does not detect interference during the long-term sensing, UE 420 may transmit a feedback message indicating no interference. There may be no restrictions on future transmissions. If UE 420 does detect interference (e.g., from beam 502), UE 420 may transmit a feedback message indicating the interference, long-term measurements for beams, and/or preferred beam 504. Transmissions may be restricted to beams other than beam 502.

As indicated above, FIG. 6 is provided as an example. Other examples may differ from what is described with regard to FIG. 6.

Figure 7:
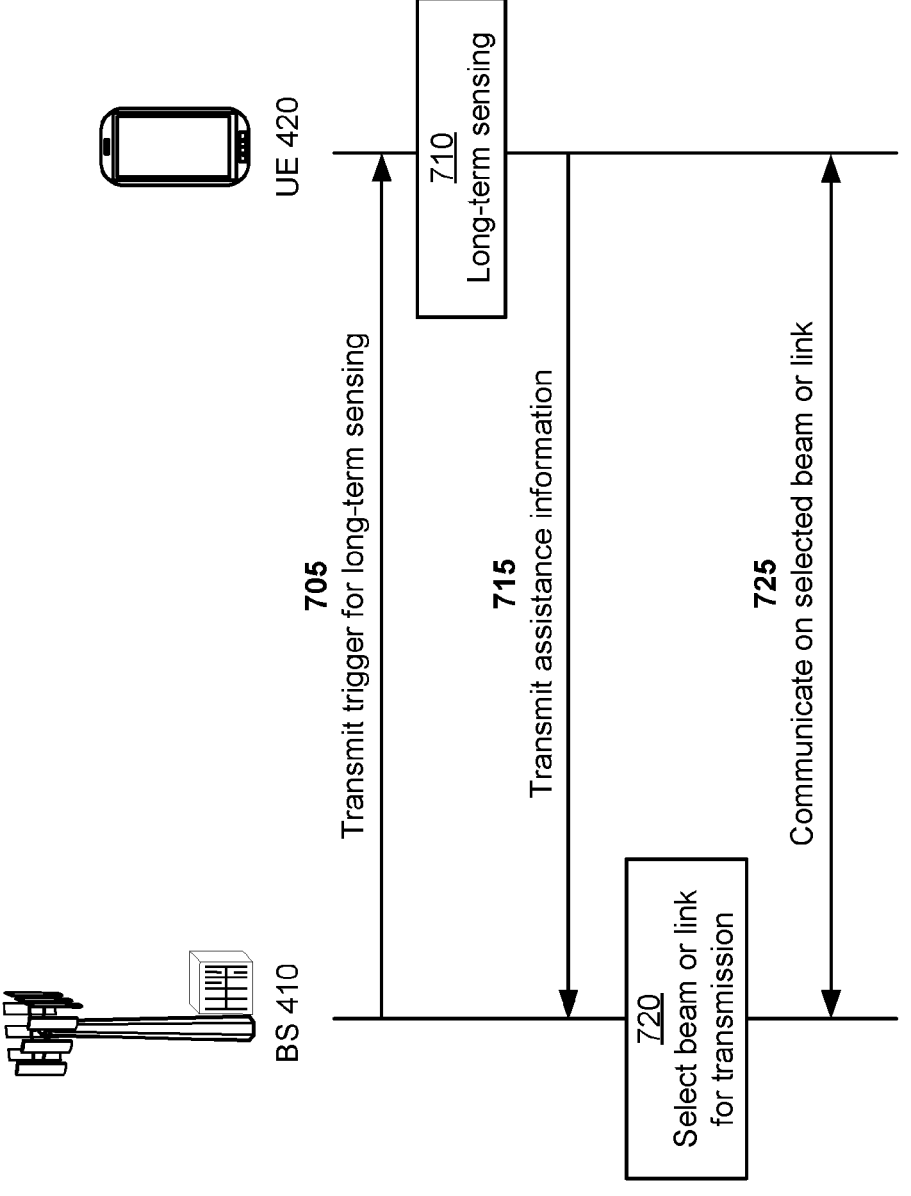
FIG. 7 is a diagram illustrating an example of signaling for long-term sensing for receiver-assisted channel access, in accordance with the present disclosure.

FIG. 7 is a diagram illustrating an example 700 of signaling for long-term sensing for receiver-assisted channel access, in accordance with the present disclosure. As shown in FIG. 7, UE 420 may communicate (e.g., transmit an uplink transmission and/or receive a downlink transmission) with BS 410. UE 420 and BS 410 may be part of a wireless network (e.g., wireless network 100).

As shown by reference number 705, BS 410 may transmit a trigger for long-term sensing for receiver-assisted channel access. This means that UE 420 is to perform long-term sensing and provide assistance information to BS 410 to assist BS 410 with accessing a channel. BS 410 may perform channel sensing (e.g., LBT), including long-term channel sensing, in addition to receiving assistance information from UE 420. The trigger may be transmitted in a radio resource control (RRC) message, a medium access control control element (MAC-CE), or downlink control information (DCI).

As shown by reference number 710, UE 420 may perform long-term sensing to obtain long-term measurements. A time offset and/or a long-term measurement duration may extend beyond a time duration for configured resources. UE 420 may choose a time offset or a measurement duration based at least in part on a configuration by BS 410, or UE 420 may use a same starting point but with a longer duration.

As shown by reference number 715, UE 420 may transmit assistance information to BS 410. The assistance information may include an indication of long-term measurements and/or an indication of one or more preferred beams from among configured beams. In some aspects, UE 420 may transmit information indicating an amount (e.g., percentage) of samples where the long-term measurement (e.g., RSSI) satisfies a measurement threshold (e.g., minimum RSRP, minimum SINR). BS 410 may compare this information to a threshold amount or threshold time duration (e.g., minimum duration above the measurement threshold, percentage of samples with RSSI above the measurement threshold). BS 410 may use a result of this comparison for beam selection. For example, if beam 502 suffers-80 decibel-milliwatts (dBm) interference for a time duration of 20% of a long-term sensing duration, and beam 504 suffers-65 dBm interference for a time duration of 10%, BS 410 (or UE 420) may select a beam based at least in part on comparison of 10% and 20% to a threshold amount duration or threshold time duration. In some aspects, BS 410 may select a beam based at least in part on a capability of UE 420 for interference cancelation.

As shown by reference number 720, BS 410 may select a beam and/or a link based at least in part on long-term measurements and/or preferred beams indicated in the assistance information. As shown by reference number 725, BS 410 may communicate with UE 420 using the selected beam or link. This may include indicating and/or establishing the beam or link with UE 420. By using long-term sensing for receiver-assisted channel access, BS 410 and UE 420 may experience better communications, which may include less latency and less signaling resources.

As indicated above, FIG. 7 is provided as an example. Other examples may differ from what is described with regard to FIG. 7.

Figure 8:
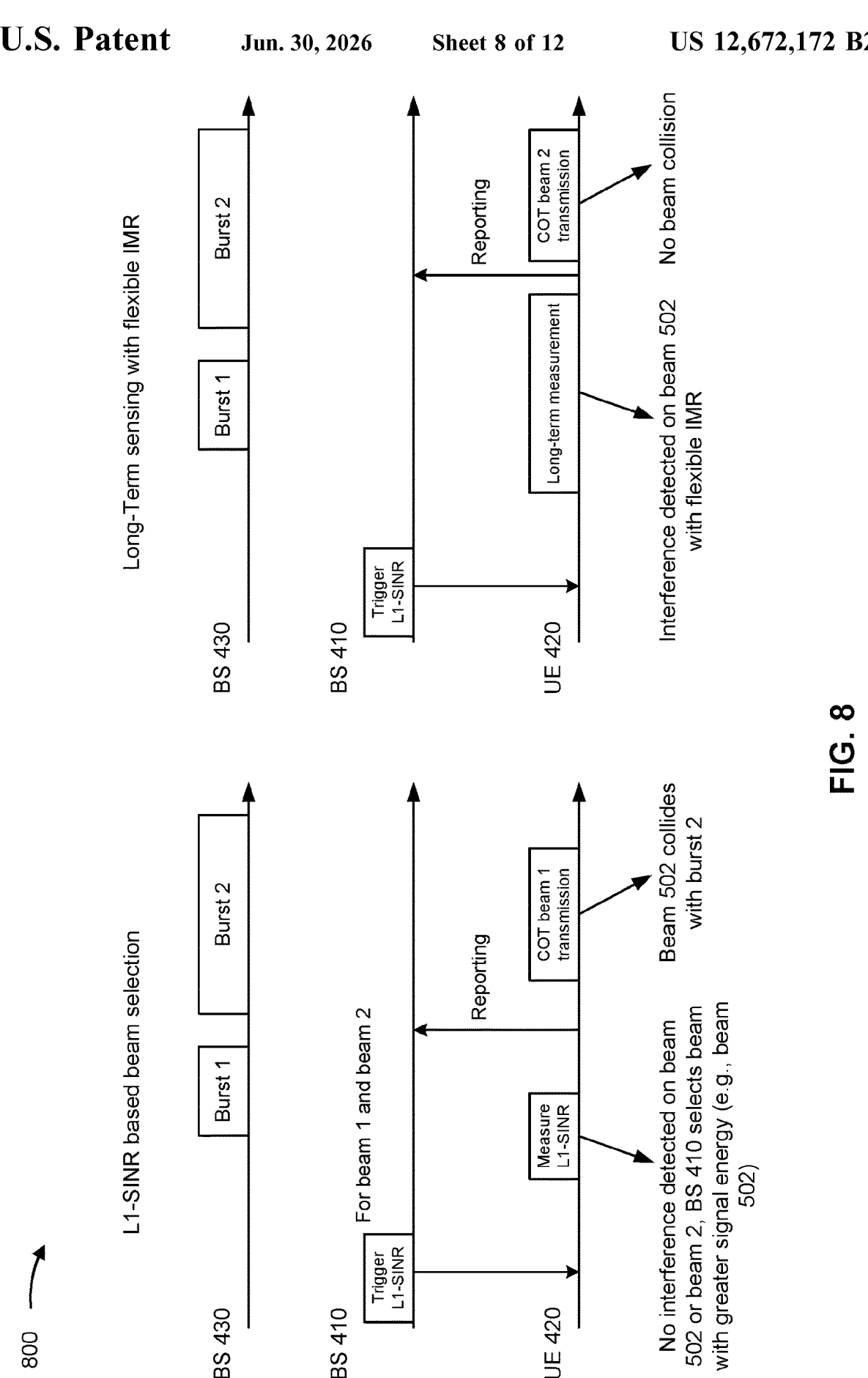
FIG. 8 is a diagram illustrating an example of a benefit of using long-term sensing for receiver-assisted channel access, in accordance with the present disclosure.

FIG. 8 is a diagram illustrating an example 800 of a benefit of using long-term sensing for receiver-assisted channel access, in accordance with the present disclosure.

Example 800 shows an example of a current procedure for L1-SINR based beam selection. With an L1-SINR measurement over a standard duration for an L1-SINR resource, UE 420 does not detect a second burst from BS 430. The L1-SINR measurement concludes before the second burst begins. A collision follows. By contrast, with a long-term measurement that is greater in duration than the L1-SINR measurement, UE 420 detects the interference on beam 502 (e.g., with flexible L1-SINR IMR) and avoids the collision.

As indicated above, FIG. 8 is provided as an example. Other examples may differ from what is described with regard to FIG. 8.

Figure 9:
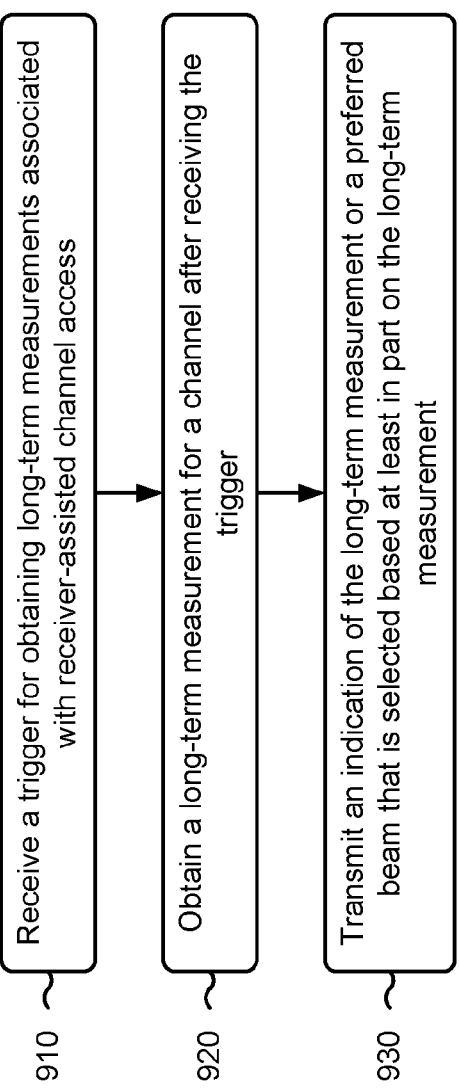
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, UE 420) performs operations associated with long-term sensing for receiver-assisted channel access.

As shown in FIG. 9, in some aspects, process 900 may include receiving a trigger for obtaining long-term measurements associated with receiver-assisted channel access (block 910). For example, the UE (e.g., using reception component 1102 depicted in FIG. 11) may receive a trigger for obtaining long-term measurements associated with receiver-assisted channel access, as described above.

As further shown in FIG. 9, in some aspects, process 900 may include obtaining a long-term measurement for a channel after receiving the trigger (block 920). For example, the UE (e.g., using reception component 1102 depicted in FIG. 11) may obtain a long-term measurement for a channel after receiving the trigger, as described above.

As further shown in FIG. 9, in some aspects, process 900 may include transmitting an indication of the long-term measurement or a preferred beam that is selected based at least in part on the long-term measurement (block 930). For example, the UE (e.g., using transmission component 1104 depicted in FIG. 11) may transmit an indication of the long-term measurement or a preferred beam that is selected based at least in part on the long-term measurement, as described above.

Process 900 may include additional aspects, such as any single aspect or any combination of aspects described below and/or in connection with one or more other processes described elsewhere herein.

In a first aspect, the long-term measurement includes an RSSI measurement for one or more configured beams of the UE.

In a second aspect, alone or in combination with the first aspect, the long-term measurement is obtained over a period of time that is greater in duration than a period of time associated with an RSSI measurement timing configuration.

In a third aspect, alone or in combination with one or more of the first and second aspects, the long-term measurement is obtained over a period of time that is greater in duration than a period of time associated with a CSI-RS or a period of time associated with an SSB measurement.

In a fourth aspect, alone or in combination with one or more of the first through third aspects, process 900 includes obtaining multiple long-term measurements over a period of time that is greater in duration than a CSI-RS or an SSB measurement, and the transmitting includes transmitting the multiple long-term measurements.

In a fifth aspect, alone or in combination with one or more of the first through fourth aspects, obtaining the long-term measurement includes obtaining an interference measurement associated with a physical layer measurement.

In a sixth aspect, alone or in combination with one or more of the first through fifth aspects, process 900 includes transmitting an interference measurement for a configured beam of the UE.

In a seventh aspect, alone or in combination with one or more of the first through sixth aspects, the indication indicated the preferred beam, and the preferred beam is selected from among configured beams of the UE based at least in part on the long-term measurement.

In an eighth aspect, alone or in combination with one or more of the first through seventh aspects, the preferred beam accounts for interference cancellation.

In a ninth aspect, alone or in combination with one or more of the first through eighth aspects, the preferred beam is selected based at least in part on a UE capability for interference cancellation.

In a tenth aspect, alone or in combination with one or more of the first through ninth aspects, process 900 includes information indicating an amount of samples where the long-term measurement satisfies a measurement threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
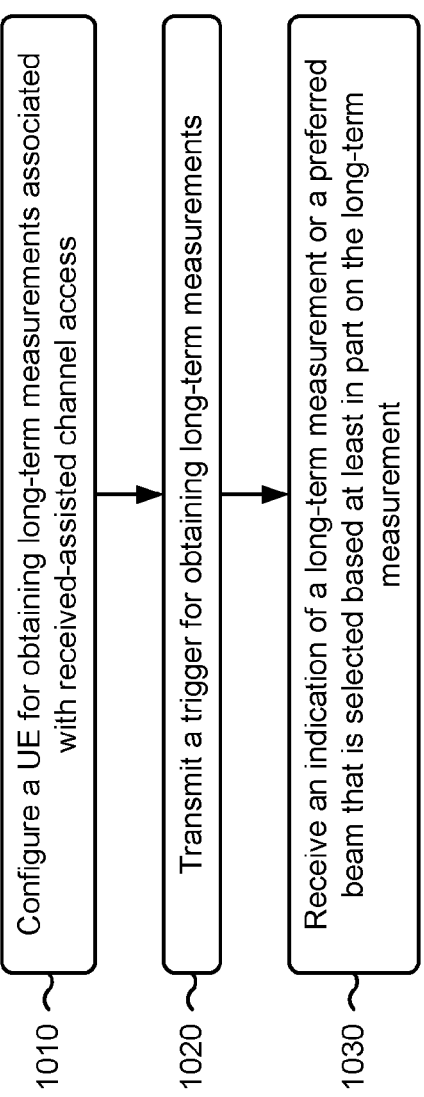
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110, BS 410) performs operations associated with long-term sensing for receiver-assisted channel access.

As shown in FIG. 10, in some aspects, process 1000 may include configuring a UE for obtaining long-term measurements associated with received-assisted channel access (block 1010). For example, the base station (e.g., using transmission component 1204 depicted in FIG. 12) may configure a UE for obtaining long-term measurements associated with received-assisted channel access, as described above.

As further shown in FIG. 10, in some aspects, process 1000 may include transmitting a trigger for obtaining long-term measurements (block 1020). For example, the base station (e.g., using transmission component 1204 depicted in FIG. 12) may transmit a trigger for obtaining long-term measurements, as described above.

As further shown in FIG. 10, in some aspects, process 1000 may include receiving an indication of a long-term measurement or a preferred beam that is selected based at least in part on the long-term measurement (block 1030). For example, the base station (e.g., using reception component 1202 depicted in FIG. 12) may receive an indication of a long-term measurement or a preferred beam that is selected based at least in part on the long-term measurement, as described above.

Process 1000 may include additional aspects, such as any single aspect or any combination of aspects described below and/or in connection with one or more other processes described elsewhere herein.

In a first aspect, process 1000 includes accessing a channel based at least in part on the long-term measurement or the preferred beam.

In a second aspect, alone or in combination with the first aspect, the long-term measurement includes an RSSI measurement for one or more configured beams of the UE.

In a third aspect, alone or in combination with one or more of the first and second aspects, the long-term measurement is obtained over a period of time that is greater in duration than a period of time associated with an RSSI measurement timing configuration.

In a fourth aspect, alone or in combination with one or more of the first through third aspects, the long-term measurement is obtained over a period of time that is greater in duration than a CSI-RS or a SSB measurement.

In a fifth aspect, alone or in combination with one or more of the first through fourth aspects, the receiving includes receiving multiple long-term measurements obtained over a period of time that is greater in duration than a CSI-RS or SSB measurement.

In a sixth aspect, alone or in combination with one or more of the first through fifth aspects, the receiving includes receiving an interference measurement associated with a physical layer measurement.

In a seventh aspect, alone or in combination with one or more of the first through sixth aspects, the receiving includes receiving an interference measurement for a configured beam of the UE.

In an eighth aspect, alone or in combination with one or more of the first through seventh aspects, the indication indicates the preferred beam, and the preferred beam is selected from among configured beams of the UE.

In a ninth aspect, alone or in combination with one or more of the first through eighth aspects, the preferred beam accounts for interference cancellation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
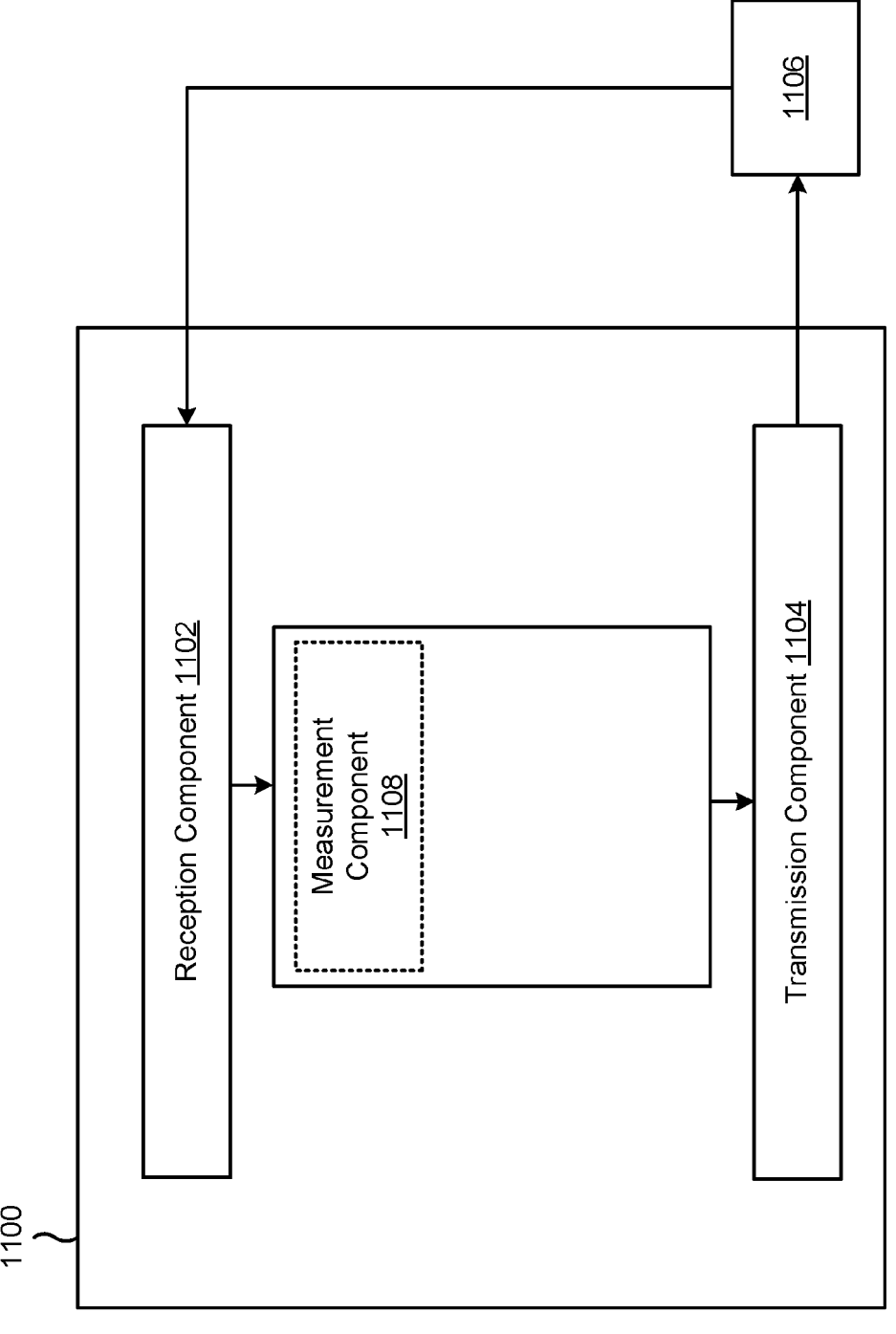
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a measurement component 1108, among other examples.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The measurement component 1108 may configured the apparatus 1100 for using long-term sensing to obtain long-term measurements. The reception component 1102 may receive a trigger for obtaining long-term measurements associated with receiver-assisted channel access. The reception component 1102 may obtain a long-term measurement for a channel after receiving the trigger. The transmission component 1104 may transmit an indication of the long-term measurement or a preferred beam that is selected based at least in part on the long-term measurement.

The reception component 1102 may obtain multiple long-term measurements over a period of time that is greater in duration than a channel state information reference signal measurement or a synchronization signal block measurement, and wherein the transmitting includes transmitting the multiple long-term measurements.

The transmission component 1104 may transmit an interference measurement for a configured beam of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
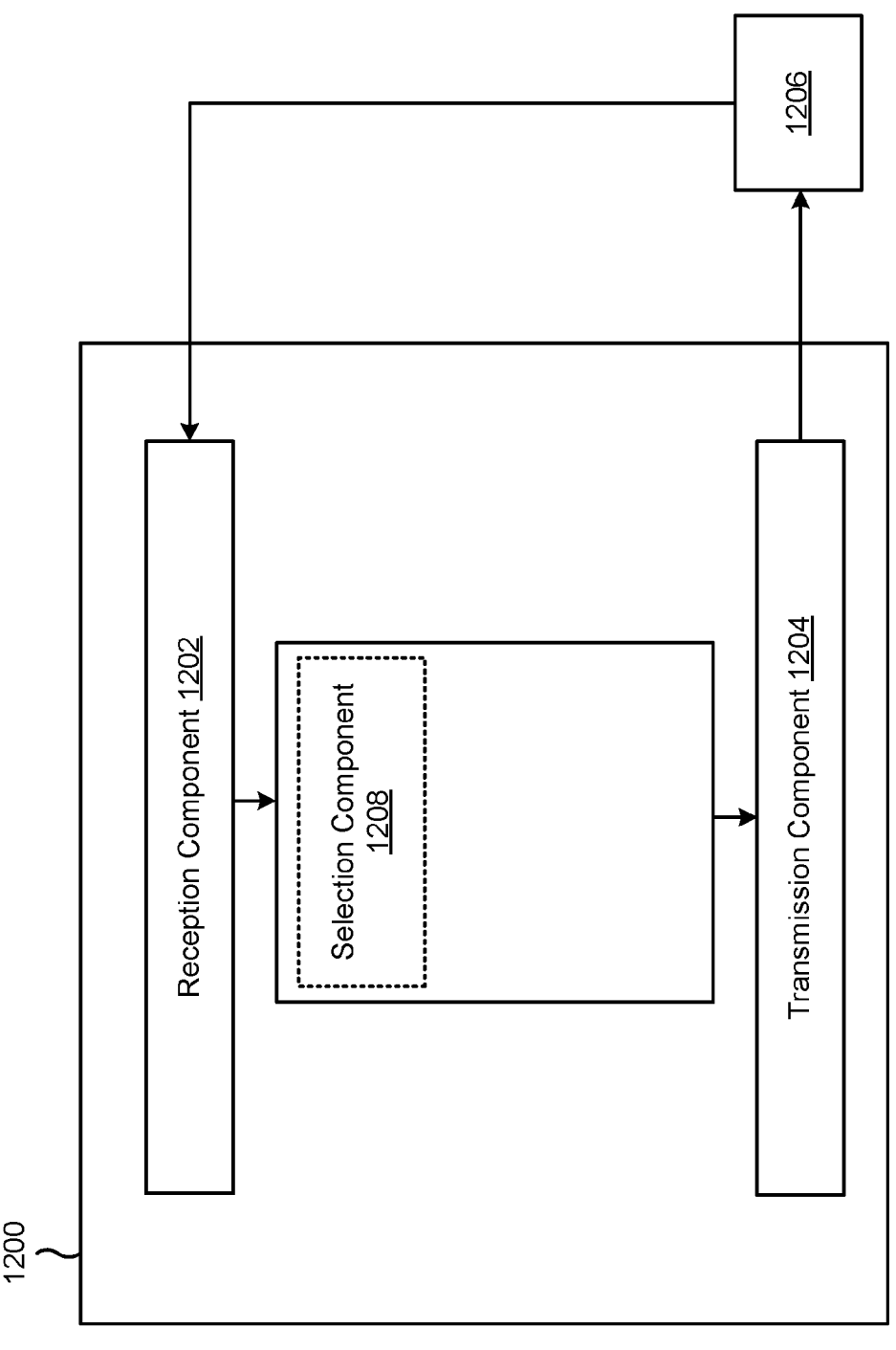

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a selection component 1208, among other examples.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may configure a UE for obtaining long-term measurements associated with received-assisted channel access. The transmission component 1204 may transmit a trigger for obtaining long-term measurements. The reception component 1202 may receive an indication of a long-term measurement or a preferred beam that is selected based at least in part on the long-term measurement. The selection component 1208 may select a beam or link based at least in part on the indication. The transmission component 1204 may access a channel based at least in part on the long-term measurement or the preferred beam.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving a trigger for obtaining long-term measurements associated with receiver-assisted channel access; obtaining a long-term measurement for a channel after receiving the trigger; and transmitting an indication of the long-term measurement or a preferred beam that is selected based at least in part on the long-term measurement.

Aspect 2: The method of Aspect 1, wherein the long-term measurement includes a received signal strength indicator (RSSI) measurement for one or more configured beams of the UE.

Aspect 3: The method of Aspect 1 or 2, wherein the long-term measurement is obtained over a period of time that is greater in duration than a period of time associated with an RSSI measurement timing configuration.

Aspect 4: The method of any of Aspects 1-3, wherein the long-term measurement is obtained over a period of time that is greater in duration than a period of time associated with a channel state information reference signal measurement or a period of time associated with a synchronization signal block measurement.

Aspect 5: The method of any of Aspects 1-4, further comprising obtaining multiple long-term measurements over a period of time that is greater in duration than a channel state information reference signal measurement or a synchronization signal block measurement, and wherein the transmitting includes transmitting the multiple long-term measurements.

Aspect 6: The method of any of Aspects 1-5, wherein obtaining the long-term measurement includes obtaining an interference measurement associated with a physical layer measurement.

Aspect 7: The method of any of Aspects 1-6, further comprising transmitting an interference measurement for a configured beam of the UE.

Aspect 8: The method of any of Aspects 1-7, wherein the indication indicated the preferred beam, and wherein the preferred beam is selected from among configured beams of the UE based at least in part on the long-term measurement.

Aspect 9: The method of Aspect 8, wherein the preferred beam accounts for interference cancellation.

Aspect 10: The method of Aspect 8, wherein the preferred beam is selected based at least in part on a UE capability for interference cancellation.

Aspect 11: The method of any of Aspects 1-10, further comprising transmitting information indicating an amount of samples where the long-term measurement satisfies a measurement threshold.

Aspect 12: A method of wireless communication performed by a base station, comprising: configuring a user equipment (UE) for obtaining long-term measurements associated with received-assisted channel access; transmitting a trigger for obtaining long-term measurements; and receiving an indication of a long-term measurement or a preferred beam that is selected based at least in part on the long-term measurement.

Aspect 13: The method of Aspect 12, further comprising accessing a channel based at least in part on the long-term measurement or the preferred beam.

Aspect 14: The method of Aspect 12 or 13, wherein the long-term measurement includes a received signal strength indicator (RSSI) measurement for one or more configured beams of the UE.

Aspect 15: The method of any of Aspects 12-14, wherein the long-term measurement is obtained over a period of time that is greater in duration than a period of time associated with an RSSI measurement timing configuration.

Aspect 16: The method of any of Aspects 12-15, wherein the long-term measurement is obtained over a period of time that is greater in duration than a channel state information reference signal measurement or a synchronization signal block measurement.

Aspect 17: The method of any of Aspects 12-16, wherein the receiving includes receiving multiple long-term measurements obtained over a period of time that is greater in duration than a channel state information reference signal measurement or a synchronization signal block measurement.

Aspect 18: The method of any of Aspects 12-17, wherein the receiving includes receiving an interference measurement associated with a physical layer measurement.

Aspect 19: The method of any of Aspects 12-18, wherein the receiving includes receiving an interference measurement for a configured beam of the UE.

Aspect 20: The method of any of Aspects 12-19, wherein the indication indicates the preferred beam, and wherein the preferred beam is selected from among configured beams of the UE.

Aspect 21: The method of Aspect 20, wherein the preferred beam accounts for interference cancellation.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the memory and the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive a trigger for obtaining long-term measurements associated with receiver-assisted channel access; obtain a long-term measurement for a channel after receiving the trigger; and
   transmit an indication of a preferred beam that is selected from among configured beams of the UE based at least in part on the long-term measurement, wherein at least one of: the preferred beam accounts for interference cancellation, or the preferred beam is selected based at least in part on a UE capability for interference cancellation.

2. The UE of claim 1, wherein the long-term measurement includes a received signal strength indicator (RSSI) measurement for one or more configured beams of the UE.

3. The UE of claim 2, wherein the long-term measurement is obtained over a period of time that is greater in duration than a period of time associated with an RSSI measurement timing configuration.

4. The UE of claim 1, wherein the long-term measurement is obtained over a period of time that is greater in duration than a period of time associated with a channel state information reference signal measurement or a period of time associated with a synchronization signal block measurement.

5. The UE of claim 1, wherein the one or more processors are configured to obtain multiple long-term measurements over a period of time that is greater in duration than a channel state information reference signal measurement or a synchronization signal block measurement, and transmit the multiple long-term measurements.

6. The UE of claim 1, wherein the one or more processors, to obtain the long-term measurement, are configured to obtain an interference measurement associated with a physical layer measurement.

7. The UE of claim 1, wherein the one or more processors are configured to transmit an interference measurement for a configured beam of the UE.

8. The UE of claim 1, wherein the one or more processors are configured to transmit information indicating an amount of samples where the long-term measurement satisfies a measurement threshold.

9. A base station for wireless communication, comprising:
   a memory; and
   one or more processors, coupled to the memory, configured to:

configure a user equipment (UE) for obtaining long-term measurements associated with received-assisted channel access; transmit a trigger for obtaining long-term measurements; and receive an indication of a preferred beam that is selected from among configured beams of the UE based at least in part on the long-term measurement, wherein at least one of: the preferred beam accounts for interference cancellation, or the preferred beam is selected based at least in part on a UE capability for interference cancellation.

10. The base station of claim 9, wherein the one or more processors are configured to access a channel based at least in part on the long-term measurement or the preferred beam.

11. The base station of claim 9, wherein the long-term measurement includes a received signal strength indicator (RSSI) measurement for one or more configured beams of the UE.

12. The base station of claim 11, wherein the long-term measurement is obtained over a period of time that is greater in duration than a period of time associated with an RSSI measurement timing configuration.

13. The base station of claim 9, wherein the long-term measurement is obtained over a period of time that is greater in duration than a channel state information reference signal measurement or a synchronization signal block measurement.

14. The base station of claim 9, wherein the one or more processors are configured to receive multiple long-term measurements obtained over a period of time that is greater in duration than a channel state information reference signal measurement or a synchronization signal block measurement.

15. The base station of claim 9, wherein the one or more processors are configured to receive an interference measurement associated with a physical layer measurement.

16. The base station of claim 9, wherein the one or more processors are configured to receive an interference measurement for a configured beam of the UE.

17. A method of wireless communication performed by a user equipment (UE), comprising:

receiving a trigger for obtaining long-term measurements associated with receiver-assisted channel access;

obtaining a long-term measurement for a channel after receiving the trigger; and transmitting an indication of a preferred beam that is selected from among configured beams of the UE based at least in part on the long-term measurement, wherein at least one of: the preferred beam accounts for interference cancellation, or the preferred beam is selected based at least in part on a UE capability for interference cancellation.

18. The method of claim 17, wherein obtaining the long-term measurement includes obtaining an interference measurement associated with a physical layer measurement.

19. The method of claim 17, further comprising transmitting information indicating an amount of samples where the long-term measurement satisfies a measurement threshold.

20. A method of wireless communication performed by a base station, comprising:

configuring a user equipment (UE) for obtaining long-term measurements associated with received-assisted channel access;

transmitting a trigger for obtaining long-term measurements; and receiving an indication of a preferred beam that is selected from among configured beams of the UE based at least in part on the long-term measurement, wherein at least one of: the preferred beam accounts for interference cancellation, or the preferred beam is selected based at least in part on a UE capability for interference cancellation.

21. The method of claim 20, further comprising accessing a channel based at least in part on the long-term measurement or the preferred beam.

* * * * *